United States Patent
Järvenkylä et al.

[11] Patent Number: 6,086,239
[45] Date of Patent: Jul. 11, 2000

[54] EXTRUDER WITH SUPPLY CONDUIT FOR SUPPLYING EVEN FLOW OF MATERIAL

[75] Inventors: Jyri Järvenkylä, Hollola; Kari Kirjavainen, Espoo, both of Finland

[73] Assignee: Conenor Oy, Espoo, Finland

[21] Appl. No.: 09/117,248

[22] PCT Filed: Feb. 7, 1997

[86] PCT No.: PCT/FI97/00080

§ 371 Date: Sep. 29, 1998

§ 102(e) Date: Sep. 29, 1998

[87] PCT Pub. No.: WO97/28949

PCT Pub. Date: Aug. 14, 1997

[30] Foreign Application Priority Data

Feb. 8, 1996 [FI] Finland ................................ 960589

[51] Int. Cl.[7] ........................................ B29B 7/58
[52] U.S. Cl. .......................... 366/76.1; 366/98; 366/305
[58] Field of Search ............... 366/69, 76.1, 96–99, 366/302, 305, 342, 343; 425/133.1, 207, 209, 380, 380.3

[56] References Cited

U.S. PATENT DOCUMENTS

| | | |
|---|---|---|
| 2,764,780 | 10/1956 | Reifenhauser . |
| 2,779,054 | 1/1957 | Doriat et al. ............................. 366/99 |
| 2,995,346 | 8/1961 | Samples ................................. 366/98 |
| 3,314,108 | 4/1967 | Wienand et al. . |
| 3,315,944 | 4/1967 | Gustrau .................................. 366/99 |
| 5,387,386 | 2/1995 | Kirjavainen . |
| 5,538,343 | 7/1996 | Tynan ................................... 366/302 |
| 5,674,004 | 10/1997 | Takeuchi ............................... 425/207 |

FOREIGN PATENT DOCUMENTS

| | | |
|---|---|---|
| 9906779 | 4/1994 | European Pat. Off. . |
| 1961078 | 6/1971 | Germany . |
| 2659182 | 7/1977 | Germany . |
| 1604446 | 11/1990 | U.S.S.R. ................................ 366/305 |
| 2202783 | 10/1988 | United Kingdom . |

*Primary Examiner*—Charles E. Cooley
*Attorney, Agent, or Firm*—Ladas & Parry

[57] ABSTRACT

An extruder including: (a) at least two concentric stators including (i) an inner stator having at least an outer surface that is at least mostly conical and (ii) an outer stator having at least an inner surface that is at least mostly conical; (b) at least one rotatable rotor that is at least mostly conical; and (c) a supply conduit for supplying material into a space between the stators. The at least one rotatable rotor being disposed in the space between the inner stator and the outer stator. The at least one rotor includes a plurality of ducts that define passages through which material can flow from the space to an interior of the rotor. Each of the plurality of ducts defines an opening or groove that opens into the space. The supply conduit has a conduit end defining an orifice. The conduit end is disposed with respect to the at least one rotor such that, as the at least one rotor rotates, successive of the duct ends pass in proximity to the conduit end with successive portions of the openings or grooves aligned with the orifice to permit a flow of material from the conduit end through the successive portions to the interior of the at least one rotor. The duct ends and the conduit end are arranged and disposed in the extruder such that an area of the successive portions of the openings or grooves aligned with the orifice to permit said flow of material remains substantially constant throughout rotation of the at least one rotor.

20 Claims, 2 Drawing Sheets

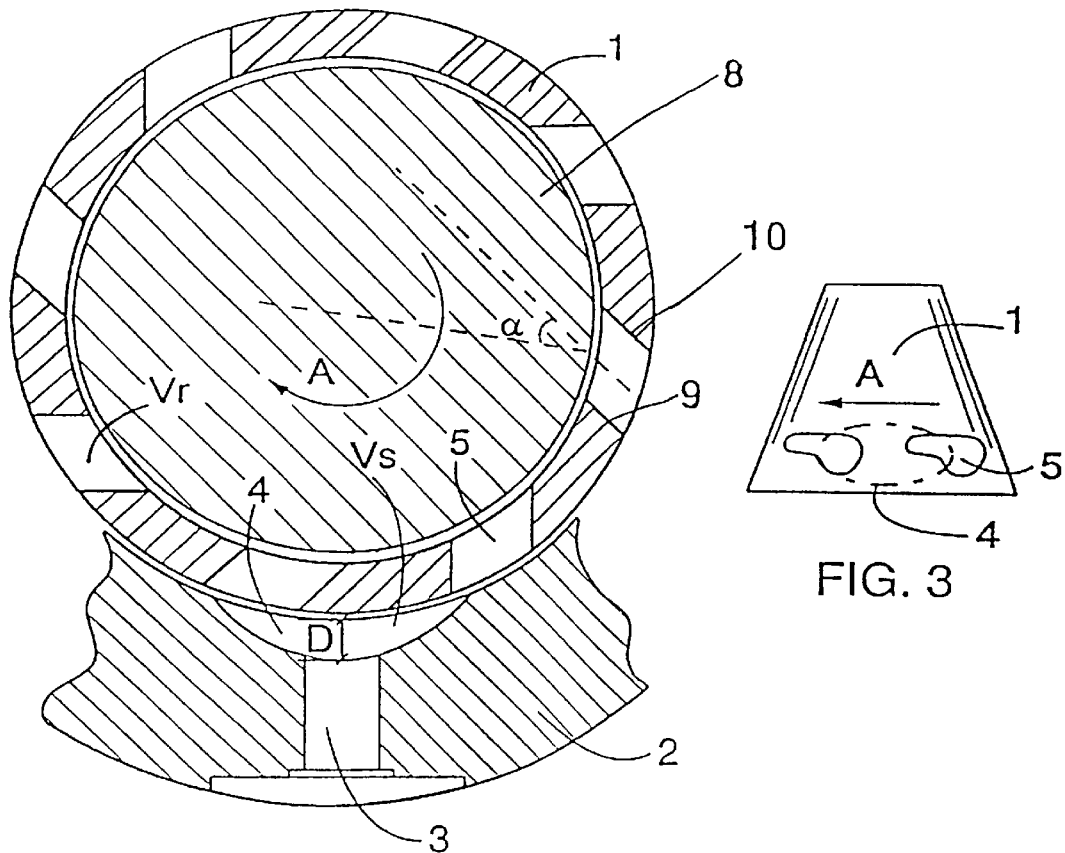
FIG. 1
FIG. 3
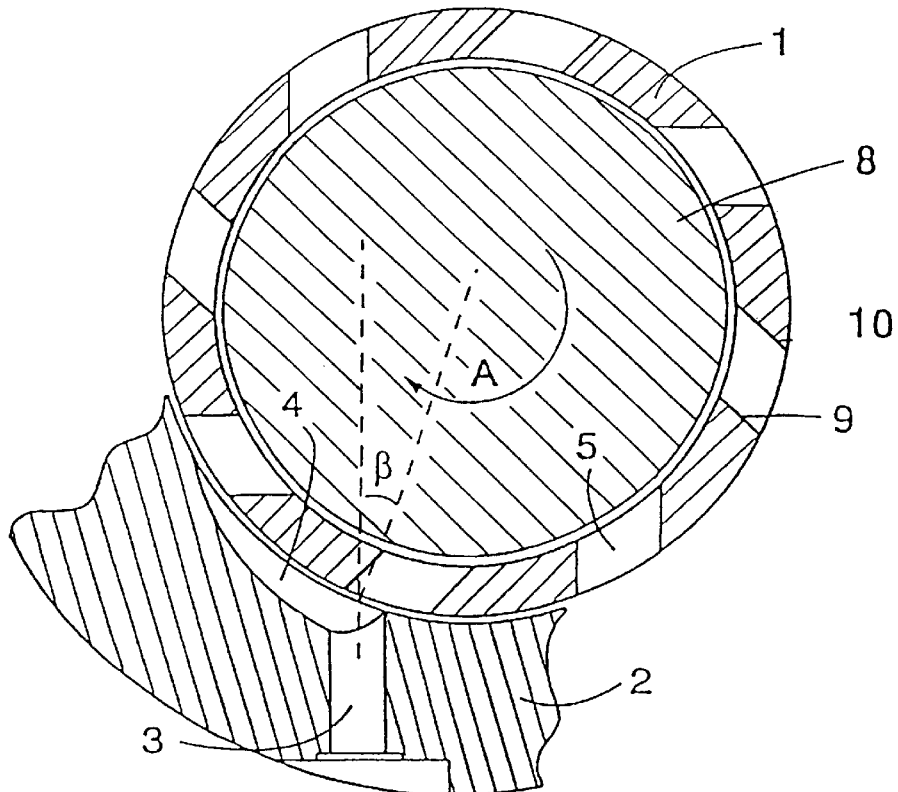
FIG. 2

EXTRUDER WITH SUPPLY CONDUIT FOR SUPPLYING EVEN FLOW OF MATERIAL

FIELD OF THE INVENTION

The invention relates to an extruder comprising at least two stators, the inner stator having at least an outer surface that is at least mostly conical and the outer stator having at least an inner surface that is at least mostly conical, at least one rotatable rotor that is at least mostly conical being situated between the stators, the extruder comprising a supply conduit for supplying material into the space between the stators, and the rotor comprising at the orifice of the supply conduit openings via which at least a part of the material to be fed is able to flow.

BACKGROUND OF THE INVENTION

U.S. Pat. No. 3,314,108 discloses an extruder comprising two conical stators and a conical rotor that is rotatably placed between the stators. The plastic material to be extruded is supplied via two different conduits to different sides of the rotor. The intermixing of the materials to be fed via different conduits is prevented with seals at the end where the material is supplied. The material is fed to the interior of the rotor in such a way that at the material supply conduit the rotor comprises openings through which the material can flow to the interior of the rotor. As the rotor rotates, the openings move past the orifice of the supply conduit whereupon the resistance acting on the material to be supplied along the conduit varies depending on the position of the opening with respect to the orifice. This causes a pumping effect in the material, deteriorating the rate of supply and the even distribution of the material.

European patent application 89 906 779.7 discloses an extruder comprising several conical stators, and conical rotors that are rotatably placed between the stators. The material to be extruded is supplied along one conduit to the beginning of each rotor, whereupon the rotor comprises at the inlet openings via which the material can also flow to the other side of the rotor. As above, the problem with this arrangement is that the resistance acting on the material to be supplied along the conduit varies as the rotor rotates and as the openings of the rotor simultaneously pass the orifice of the conduit.

The purpose of the present invention is to provide an extruder which comprises none of the aforementioned problems and in which the material to be extruded can be evenly supplied into the extruder.

SUMMARY OF THE INVENTION

The extruder according to the invention is characterized in that the end of the supply conduit and ducts formed of the openings and/or grooves of the rotor are designed in such a way that the sum of the areas of the parts of the ducts visible at the end of the supply conduit remains substantially constant at each moment when the rotor rotates.

An essential idea of the invention is that at the end of the conduit supplying material to the rotor, i.e. at the junction between the stator and the rotor, at each moment as the rotor rotates the sum of the areas of the rotor ducts visible at the end of the supply conduit remains substantially constant. Further, the idea of a preferred embodiment is that the width of the end of the supply orifice substantially equals the distance between the centers of the rotor ducts or a multiple of the distance. In such a case, material is supplied at least temporarily from the supply conduit to a minimum of two different rotor ducts simultaneously. The idea of yet another preferred embodiment is that the end of the supply conduit comprises an extension, whereupon the end of the supply conduit has a greater cross-section than the rest of the supply conduit. Further, the idea of a preferred embodiment is that the extension at the end of the supply conduit has a volume substantially equalling the volume of the rotor ducts situated at the extension. The idea of yet another preferred embodiment is that the extension at the end of the supply conduit has an asymmetrical form, i.e. the extension tapers off at the end.

The invention has the advantage that the material to be fed along the supply conduit can flow evenly from the supply conduit via the rotor ducts, whereupon there will be no pumping effect in the flow of material. By means of the extension at the end of the supply conduit, the conduit itself can be made so small that the flow of mass through the supply conduit does not have to remain in the supply conduit for long, which prevents the harmful uneven warming of the material. When the volume of the extension at the end of the supply conduit and the corresponding volumes of the rotor ducts are made equal in magnitude, the material in the extension can be made to change entirely during the time the rotor openings move from one end of the extension to the other, whereupon the time the material remains in the extruder will be as short as possible and narrow in distribution. When the extension at the end of the supply conduit is made asymmetrical, the rotating rotor makes the material rotate in the same direction, and the asymmetrical extension that tapers off towards the end forces the material to enter via the rotor openings, providing a more even flow of supply.

BRIEF DESCRIPTION OF THE DRAWINGS

The invention will be described in greater detail in the accompanying drawings, in which FIG. 1 is a cross-section of an inlet for mass in an extruder according to the invention, FIG. 2 is a cross-section of another embodiment of an inlet for mass in an extruder according to the invention, FIG. 3 is a schematic side view of a rotor embodiment.

DETAILED DESCRIPTION

Figure 4:
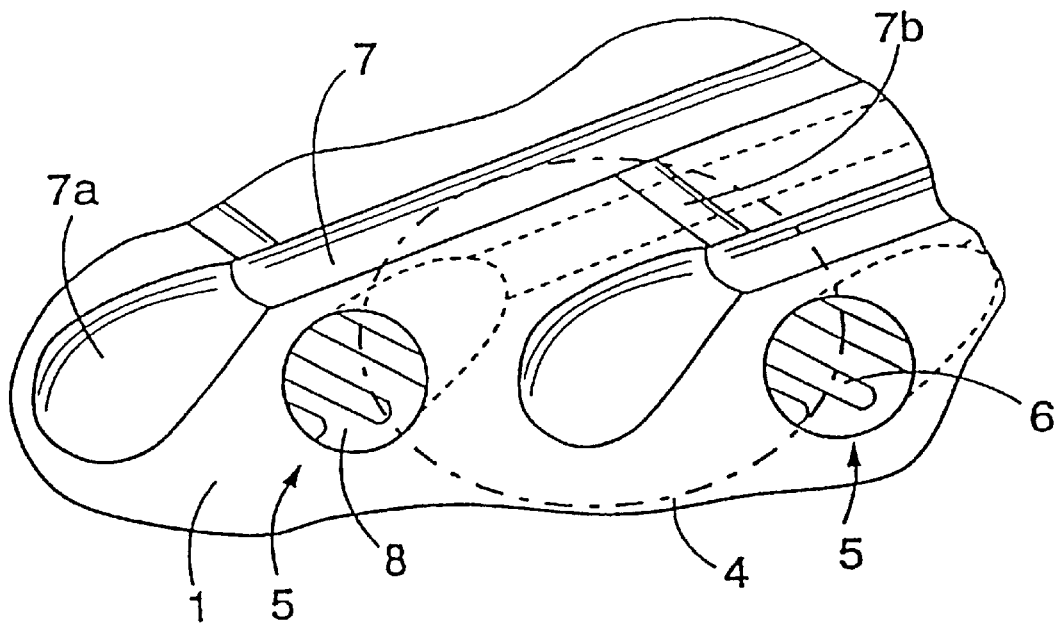
FIG. 4 is a schematic side view of another rotor embodiment.

FIG. 1 is a cross-section of an inlet for material in an extruder. The extruder comprises a conical rotor 1 which is arranged to rotate in the direction indicated by arrow A. The definition 'conical' naturally refers to a mostly conical arrangement, i.e. for example some parts of the rotor may be cylindrical, containing for instance a cylindrical extension, as described in the Applicant's own patent application PCT/FI96/00261, which is incorporated herein by reference for all purposes. A stationary stator 2 is placed outside the rotor 1. For the sake of clarity, the stator 2 is shown in FIG. 1 only in part, but in practice it encircles the rotor 1. Inside the rotor 1 there is another stationary stator 8. A supply conduit 3 is arranged to pass through the outer stator 2. Via the supply conduit 3 the extruder receives material from which it forms for example a plastic pipe, a cable sheath, a film, or some other similar product. The rotor 1 comprises openings 5 via which the material to be fed from the supply conduit 3 can pass to the interior of the rotor 1 between the rotor 1 and the inner stator 8. The structure of the extruder is fully known per se to a person skilled in the art, and therefore it is not described in greater detail in this connection.

An extension 4 is formed at the end of the supply conduit 3, i.e. at the end closer to the rotor 1. The area of the extension 4 part against the rotor 1 is greater than the area of the supply conduit 3 cross-section. In this way, the time the material to be fed remains in the supply conduit 3 can be shortened, which prevents problems caused by the uneven warming of the material. The supply conduit 3 typically has the cross-sectional shape of a circle, but the cross-section may also have some other form, such as an ellipse, or it may be asymmetrical in some way. The material to be extruded is fed into the supply conduit 3 for example with a feed worm or a feed hopper or in some other manner known per se.

The width of the extension 4 part on the side of the rotor 1 is in FIG. 1 substantially equal to the distance between the centers of the rotor openings 5. In order to ensure sufficiently good properties, the width of the extension 4 and the distance between the centers of the openings 5 should not differ more than 15% from one another. The junction of the extension 4 situated against the rotor 1 may have for example the shape of an elliptical calotte, a circle or some other suitable form. Asymmetrical shapes are also possible. When the rotor 1 rotates in the direction of the arrow A, one opening 5 is visible at the extension 4 for a while. As the rotor 1 rotates forward, two openings 5 are visible at the extension 4 for a while, but each of these openings 5 is visible at the extension 4 only in part. The openings 5 and the extension 4 are shaped suitably in such a way that the parts of the openings 5 visible at the extension 4 constitute together an area that is at all times substantially equal to the total area of the opening 5. In other words, when the opening 5 that is first visible at the extension 4 passes the extension 4 in such a way that it cannot be seen in full in the area of the extension 4, the next opening 5 appears. Furthermore, as the area of the first opening visible at the extension 4 becomes smaller and smaller, a correspondingly greater area of the next opening S is visible. The areas of the sections of the openings 5 visible at the extension 4 should not vary more than 40% from the average of these areas. If the variation is smaller, the result is naturally also better.

The openings 5 are typically circular, but other forms of openings, for example elliptical, are also possible. The openings 5 may also be asymmetrical. The openings 5 are preferably made oblique at an angle α with respect to the rotor radius. The ease with which the material to be fed passes through the openings 5 can be influenced by changing the angle α. The wider the angle α, the more sharply the edge of the opening 5 cuts into the material to be supplied. Further, when the angle is wide, the edge of the opening 5 increases the breaking of the fibers in the material to be supplied.

It is preferable to make the volume of the extension 4 and the volume of the opening 5 substantially equal. The volume of the opening 5 is determined by the outer and inner surfaces of the rotor 1 and by the walls of the opening 5. Correspondingly, the volume of the extension 4 is determined by the area of the extension against the rotor 1, the depth D of the extension, and the shape of the extension worked into the stator. When the volume Vr of the opening 5 equals the volume Vs of the extension 4, the material to be fed can be supplied into one opening 5 in an amount corresponding to the volume of the extension 4, whereupon the time the material to be fed dwells in the extruder can be carefully controlled. The volume Vr of the openings 5 should not deviate more than 40% from the volume Vs of the extension 4, so that the dwell time of the material can be controlled.

FIG. 2 shows a cross-section of another embodiment of an inlet for mass in an extruder according to the invention. The numerals in FIG. 2 correspond to those of FIG. 1. The extension 4 of the supply conduit 3 is made asymmetrical in such a way that the volume of the extension decreases towards the end section in the direction of rotation A of the rotor 1. The rotor 1 rotating in direction A forces the material to be fed to rotate in the same direction, and the decreasing volume of the extension 4 makes the material enter through the opening 5. The material flows evenly since it does not have to change the direction of flow when it emerges from the supply conduit 3 to the extension 4 part. The supply conduit 3 is further positioned in such a way that it is not directed at the center of the rotor 1 but past it by an angle β. The material to be supplied can thus be made to flow even better and more fluently according to the direction of rotation of the rotor 1. When the angle β is increased, the extension 4 leading off the supply conduit 3 can be decreased, and at the utmost the angle β can be made so wide that the supply conduit 3 meets the rotor 1 almost tangentially whereupon no separate extension 4 is needed, but the width of the supply conduit orifice facing the rotor 1 substantially equals the distance between the centers of the openings 5 or a multiple of the distance.

FIG. 3 is a schematic side view of a rotor embodiment. The numerals in FIG. 3 correspond to those in FIGS. 1 and 2. FIG. 3 shows the conical shape of the rotor 1. The stators provided in the interior and exterior of the rotor have naturally a conical shape at least at the surfaces on the side of the rotor. The openings 5 are asymmetrical whereupon, when material is supplied from the supply conduit 3, a small amount of material first passes through the opening 5, and when the opening 5 arrives closer to the orifice of the supply conduit, more of the opening is visible whereupon more material passes through the opening 5 at the end. The outlines of the extension 4 in the supply conduit 3 are shown schematically in FIG. 3 by means of a dash-and-dot line. The asymmetrical rotor opening according to FIG. 3 provides each opening with supply that accelerates towards the end of the period during which the opening is situated at the supply conduit 3.

FIG. 4 is a side view of a part of a rotor 1 in an apparatus according to the invention. The numerals in FIG. 4 correspond to those of FIGS. 1 to 3. FIG. 4 shows the rotor 1 at the section where material is supplied. In the case shown in FIG. 4, the material to be extruded is supplied with one supply device both to the exterior and interior of the rotor 1. At the supply device the rotor 1 comprises openings 5 via which some of the material can flow from the supply device inside the rotor 1. The edges of the openings 5 are provided with bevels such that a bevel ensures the smooth transfer of material via the opening 5 to a groove provided inside the stator. In FIG. 4, the bevels directing material inside the rotor 1 and the grooves provided inside the rotor are illustrated with broken lines. Through the openings 5 it is possible to see grooves 6 that are provided in the stator 8 and that facilitate the transfer of material between the rotor 1 and the inner stator 8.

There are grooves 7 beginning from between the openings 5 from outside the rotor 1. At the beginning of the grooves 7 there is an enlargement 7a that is also made sloping. The material to be supplied thus arrives from the supply conduit to the enlargement 7a and the groove 7 in such a way that the material is conducted from there to the exterior of the rotor 1 between the rotor 1 and the outer stator 2. Only one supply device is then needed to supply material evenly both to the interior and exterior of the rotor.

The outlines of the extension 4 in the supply conduit are shown schematically in FIG. 4 by means of a dash-and-dot line. The area of the ducts formed by the grooves 7 of the rotor 1, their enlargement 7a and the openings 5, visible in the area of the extension 4, remains substantially constant as the rotor 1 rotates. Also, the volumes of the ducts most preferably correspond to the volume of the extension 4. The surface and volume of the ducts 4 can be easily adjusted by providing one or more intermediate grooves 7b between the grooves 7 outside the rotor 1. By means of the intermediate grooves 7b it is also possible to facilitate the effective supply of the material between the rotor 1 and the stator 2,8.

No enlargements 7a are necessarily needed at the ends of the grooves 7 of the rotor 1, but the grooves 7 may also be of substantially equal width along their entire length. The grooves 7 may also begin only above the openings 5 so that it is easier to place the grooves 7 close to each other. In such a case, at the lower section of the supply orifice the rotor ducts are only formed by openings 5, and at the upper section they are formed by grooves 7 and possibly enlargements 7a and intermediate grooves 7b.

Figure 5:
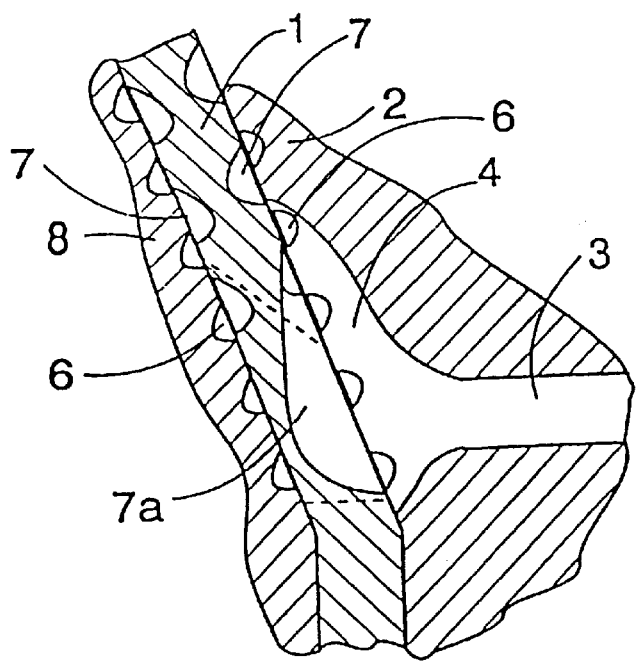
FIG. 5 is a cross-section of the arrangement of FIG. 4.

FIG. 5 is a cross-section of the rotor part shown in FIG. 4. The numerals of FIG. 5 correspond to those of FIGS. 1 to 4. Material is most preferably supplied to the supply conduit 3 with a force-feed screw which provides a sufficiently high pressure in the material to be supplied as it moves to the extruder. The force-feed screw and the bevels provided after the openings 5 and the enlargement 7a of the grooves 7 ensure a sufficient amount of the material to be extruded in the grooves 7 so that the extruder assuredly has a good and constant yield. In FIG. 5, the opening 5 situated behind the point of cross-section and the related bevel are illustrated with a broken line.

The drawing and the related description are only intended to illustrate the inventive idea. The details of the invention may vary within the scope of the claims. Therefore, more than two openings 5 of the rotor 1 may be simultaneously visible at the end of the supply conduit as long as the sum of the areas of the visible parts of the openings 5 remains substantially constant. Correspondingly, the width of the end of the supply conduit is then substantially equal to a multiple of the distance between the centers of the openings 5 in the rotor 1. The extruder may naturally also comprise more than one rotor and two stators.

The invention as claimed is:

1. An extruder comprising:
   (a) at least two concentric stators including (i) an inner stator having at least an outer surface that is at least mostly conical and (ii) an outer stator having at least an inner surface that is at least mostly conical;
   (b) at least one rotatable rotor that is at least mostly conical, said at least one rotatable rotor being disposed in a space between the inner stator and the outer stator, said at least one rotor comprising duct means, including a plurality of ducts, for defining a plurality of passages through which material can flow from the space to an interior of the at least one rotor, each of said plurality of ducts comprising a duct end defining an opening or groove that opens into said space; and
   (c) a supply conduit for supplying material into the space between the stators, said supply conduit comprising a conduit end defining an orifice, said conduit end being disposed with respect to the at least one rotor such that, as the at least one rotor rotates, successive of the duct ends pass in proximity to the conduit end with successive portions of the openings or grooves of the duct ends aligned with the orifice of the conduit end to permit a flow of material from the conduit end through said successive portions to the interior of the at least one rotor, said duct ends and said conduit end being arranged and disposed in the extruder such that an area of the successive portions of the openings or grooves of the duct ends aligned with the orifice of the conduit end to permit said flow of material remains substantially constant throughout rotation of the at least one rotor.

2. An extruder according to claim 1, wherein each of the duct ends defines an opening having a center, the center of each opening being separated from the center of a successive opening by a distance d, the conduit end having a width in a direction of rotation of the rotor that is substantially equal to the distance d or to a multiple of the distance d.

3. An extruder according to claim 2, wherein the supply conduit is disposed at an angle β with respect to a center of the at least one rotor so that the material supplied by the conduit to the interior of the at least one rotor is directed away from the center.

4. An extruder according to claim 2, wherein the supply conduit comprises a first portion and an extension, said extension having said conduit end, said conduit end having a cross-section that is greater than a cross-section of the first portion.

5. An extruder according to claim 4, wherein each of the plurality of ducts comprises a volume Vr and said extension comprises a volume Vs that is substantially equal to said volume Vr.

6. An extruder according to claim 5, wherein the extension is asymmetrical in shape with the extension tapering at said conduit end.

7. An extruder according to claim 2, wherein each of said ducts comprises a plurality of edges, the plurality of edges being disposed obliquely at an angle α with respect to a radius of the rotor.

8. An extruder according to claim 1, wherein the supply conduit is disposed at an angle β with respect to a center of the at least one rotor so that the material supplied by the conduit to the interior of the at least one rotor is directed away from the center.

9. An extruder according to claim 8, wherein the supply conduit comprises a first portion and an extension, said extension having said conduit end, said conduit end having a cross-section that is greater than a cross-section of the first portion.

10. An extruder according to claim 9, wherein each of the plurality of ducts comprises a volume Vr and said extension comprises a volume Vs that is substantially equal to said volume Vr.

11. An extruder according to claim 8, wherein each of said ducts comprises a plurality of edges, the plurality of edges being disposed obliquely at an angle α with respect to a radius of the rotor.

12. An extruder according to claim 1, wherein the supply conduit comprises a first portion and an extension, said extension having said conduit end, said conduit end having a cross-section that is greater than a cross-section of the first portion.

13. An extruder according to claim 12, wherein each of the plurality of ducts comprises a volume Vr and said extension comprises a volume Vs that is substantially equal to said volume Vr.

14. An extruder according to claim 13, wherein the extension is asymmetrical in shape with the extension tapering at said conduit end.

15. An extruder according to claim 13, wherein each of the plurality of ducts has an opening that is asymmetrical in shape.

16. An extruder according to claim 12, wherein the extension is asymmetrical in shape with the extension tapering at said conduit end.

17. An extruder according to claim 16, wherein each of the plurality of ducts has an opening that is asymmetrical in shape.

18. An extruder according to claim 12, wherein each of said ducts comprises a plurality of edges, the plurality of edges being disposed obliquely at an angle α with respect to a radius of the rotor.

19. An extruder according to claim 1, wherein each of said ducts comprises a plurality of edges, the plurality of edges being disposed obliquely at an angle α with respect to a radius of the rotor.

20. An extruder according to claim 1, wherein each of the plurality of ducts has an opening that is asymmetrical in shape.

* * * * *